United States Patent [19]

Hofmann

[11] 3,901,046

[45] Aug. 26, 1975

[54] WEIGHT BALANCING ASSEMBLY

[75] Inventor: Dionys Hofmann, Darmstadt, Germany

[73] Assignee: Gebr. Hofmann KG, Darmstadt, Germany

[22] Filed: Mar. 12, 1974

[21] Appl. No.: 450,376

[30] Foreign Application Priority Data

Apr. 17, 1973 Germany............................ 2319486

[52] U.S. Cl..................... 64/1 V; 74/574; 188/1 B
[51] Int. Cl. ............................................... F16c 3/00
[58] Field of Search ......... 64/1 V, 1 S, 1 R; 74/573, 74/574; 188/1 B; 301/5 B

[56] References Cited
UNITED STATES PATENTS

| | | |
|---|---|---|
| 2,941,631 | 6/1960 | Fosberry et al....................... 74/574 |
| 3,191,997 | 6/1965 | Colvert................................. 74/573 |
| 3,345,884 | 10/1967 | Kuderko.............................. 188/1 B |
| 3,611,830 | 10/1971 | Shank................................... 74/574 |
| 3,774,472 | 11/1973 | Mitchell.............................. 188/1 B |

Primary Examiner—Samuel Scott
Assistant Examiner—Randall Heald
Attorney, Agent, or Firm—Cushman, Darby & Cushman

[57] ABSTRACT

A balancing weight assembly with a clip having a clamping head for securing the clip to an elongate rotary body and a set of balancing members which can be attached to the clip for balancing with a barbed portion of each member so attached engaging a one of a number of recesses on the side of the clip adjacent the rotary body.

6 Claims, 4 Drawing Figures

WEIGHT BALANCING ASSEMBLY

This invention relates to a balancing weight assembly for balancing an elongate rotary body such as a vehicle propelling shaft.

For balancing a universally jointed propelling shaft when mounted on a vehicle, it is known for a plurality of metal clips to be arranged one beside the other on the shaft. The clips have clamping heads for tightening the clips, and balancing of the shaft can be effected by displacing the clips relative to each other so that the clamping heads produce a resultant force to compensate for imbalance in the shaft.

It is often difficult in practice to carry this method out however, since precise balancing of the shaft requires the clips to be set in positions relative to each other such that the above-mentioned resultant force precisely compensates for the imbalance. This generally means that it is necessary to displace each of the clips in succession, until the clips assume the correct relative positions. Not only is it often extremely difficult to determine the correct relative positions of the clips, and the correct positions of the clips relative to the shaft, but also, after each measuring run which indicates that the shaft is still not precisely balanced, one or possibly more of the metal clips has to be slackened, displaced to a different position relative to the other clips, and then re-tightened. This procedure of loosening and displacing the metal clips takes up a great deal of time, and the clips are liable to slip, for example while being retightened, which adds to the problems in achieving precise adjustment of the positions of the clips.

According to the present invention, there is provided a balancing weight assembly for balancing an elongate rotary body, comprising a clip having a clamping head, and a set of balancing weight members, one or more of which can in use be fitted on the clip for balancing, the balancing weight members of the set being graduated in weight and the heaviest balancing weight member of the set substantially corresponding to the weight of the clamping head.

Balancing weight assemblies according to the present invention will now be described by way of example with reference to the accompanying drawing in which.

Figure 1:
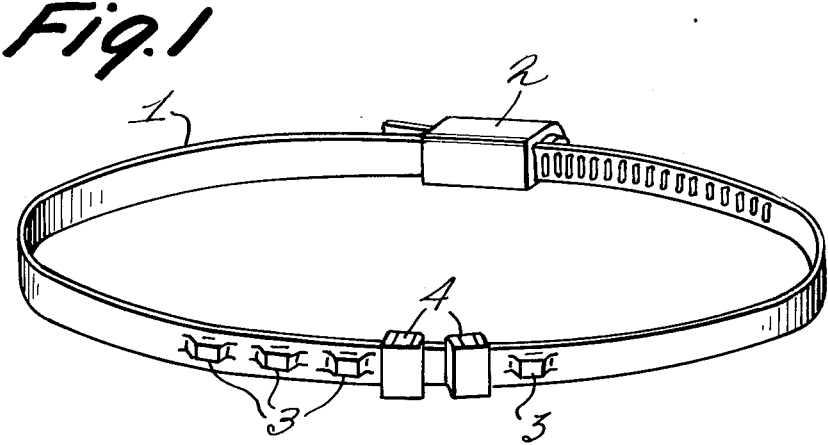
FIG. 1 shows one embodiment of the balancing weight assembly comprising a metal clip with balancing weight member.

Referring firstly to FIG. 1, a balancing weight assembly comprises a metal clip 1 with a clamping head 2. The metal clip can be firmly and securely fitted around a rotary body to be balanced, such as a universally jointed propelling shaft of a vehicle, by tightening the clip on the body by means of the clamping head 2. The clip is fitted to the rotary body for example after a first imbalance measuring run. The metal clip is secured to the shaft in such a way that the clamping head 2 is aligned in the direction of the light point of the shaft, as determined in the first measuring run. The metal clip 1 is preferably made from stainless steel, as when mounted for example on a propelling shaft, it is exposed without protection to water splashes and road dirt, and is provided with limb portions or tongue members 3 which, in the embodiment shown in FIG. 1, are punched out of the body of the ring forming the metal clip 1, although the members 3 can be formed in other ways. The tongue members 3 are arranged in a region of the clip which is substantially diametrically opposite the clamping head 2, and form recesses for receiving respective balancing weight members 4, to compensate for any weight, due to the presence of the clamping head 2, in excess of the weight required to compensate for the unbalance. The balancing weight assembly will thus comprise, beside the clip which forms a carrier for the weight members 4, a set of weight members whose weights are graduated in value, the weight of the heaviest weight member of the set substantially corresponding to the weight of the clamping head.

The balancing weight members 4 which can be of any suitable shape but which are preferably of a prismatic configuration, are inserted into the recesses formed by the bar members 3 on the interior surface of clip 1, as illustrated in FIG. 1. Recesses can be provided around substantially the whole periphery of the clip, and the recesses can lie close together, to permit fine graduation of the weight for compensating for any unbalance of the rotary body, as will be described below.

Figure 2:
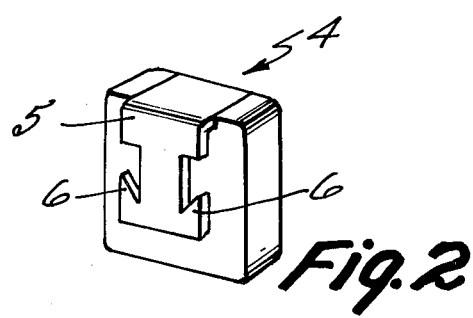
FIG. 2 shows a balancing weight member as is used in the assembly of FIG. 1.

A balancing weight member 4 is shown in detail in FIG. 2. The weight member 4 has a clip member 5 which extends adjacent one face of the body of the weight member 4 and which at its free lower end (as viewed in FIG. 2) has barb portions or members 6. The clip member 5 is fixed in position by being cast into weight member 4.

In use of the assembly, the value of weight required for compensating for the imbalance of the shaft can be determined by means of measuring weight members (not shown) which are used solely for the purpose of determining the weight value and which can be easily inserted into and removed again from the recesses formed by the bar members 3. The measuring weight members are not provided with barbs so they can be easily placed on clip 1 and removed. The measuring weight members are then removed from the bar members 3, and in their place are fitted one or more balancing weight members 4 which are of the same weight as the measuring weight members. The clip member 5 of each weight member 4 is engaged behind the bar member 3 adjacent the shaft being balanced, and there retained, even when subjected to high loadings, by means of the barb members 6.

Figure 4:
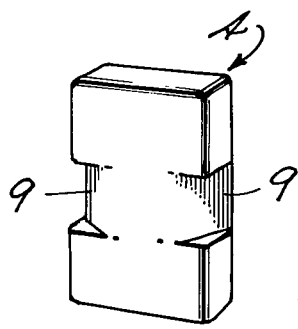
FIG. 4 shows another modified form of a balancing weight member, which can be used in conjunction with the metal clip shown in FIG. 3.
Figure 3:
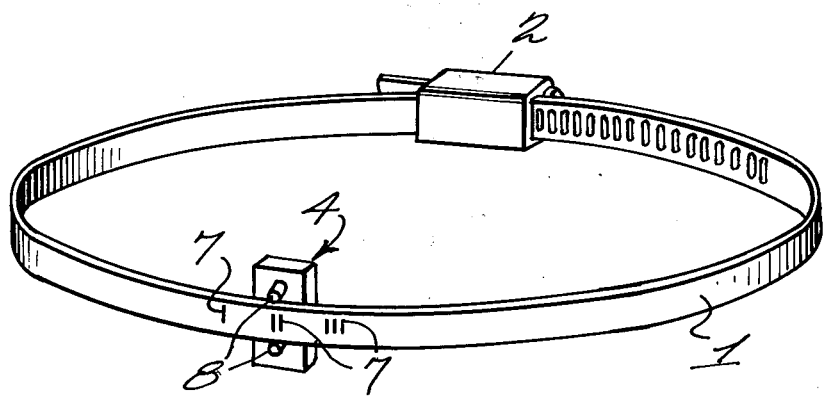
FIG. 3 shows another embodiment of the balancing weight assembly comprising a modified form of balancing weight member and clip.

Reference will now be made to FIGS. 3 and 4 in which components corresponding to the components of FIGS. 1 and 2 are denoted by the same reference numerals as are used in FIGS. 1 and 2.

The assembly of FIG. 3 also has a metal clip 1 with a clamping head 2, the metal clip being secured by means of the clamping head 2 to the propelling shaft, like the metal clip in FIG. 1, after a first measuring run. A single balancing weight member 4 with raised portions 8 is fitted under the metal clip, that is to say between the clip and the shaft, so that the weight member is gripped firmly against the shaft. The raised portions 8 prevent the weight member from slipping laterally from its position under the clip. As shown the weight member 4 is located substantially diametrically opposite the clamping head 2, and the set of weight members is graduated in steps of, for example, 2 g.

For better determining the angular position of the unbalance in a measuring operation, the clamping head 2 can be accentuated for example by color, so as to ensure better reflection of a stroboscope lamp used for measuring purposes. In order to provide a marking reference even when the clamping head 2 is in such a region that it cannot be illuminated by the stroboscope lamp, markings which as shown are in the form of marking lines 7, can be provided in the region of the clip opposite the clamping head 2. The marking lines 7 can be used as references for determination of the angular position at which the balancing weight member 4 is to be located, and can be produced for example by impressing or engraving. Numbers can also be printed on the clip, to replace the previously known number strip on such clips.

FIG. 4 shows another form of balancing weight member 4 for use in conjunction with the metal clip 1 as shown in FIG. 3. Instead of the raised portions 8 shown in FIG. 3, this balancing weight member 4 has chamfered edge portions 9 into which the clip 1 fits thereby to ensure that the weight member is securely fitted on the clip after being inserted behind the clip 1. Other means can be provided for securely fitting the balancing weight member 4 on the metal clip 1.

As mentioned above, when carrying out a balancing operation, after a first measuring run the clip is so disposed on the elongate rotary body that the clamping head of the clip is aligned substantially in the direction of the imbalance, to compensate for the light point of the unbalance of the rotary body. Experience has shown that the maximum weight of the clamping head can be 20 g as this weight is sufficient for compensation of even very substantial magnitudes of unbalance. When the clamping head has been arranged substantially in the direction of the unbalance as mentioned above, it will often be found that the weight of the clamping head is in excess of that required to compensate for the unbalance. To compensate for this excess weight, weight members 4 are fitted to the clip, to act as counterweights and reduce the effect of the weight of the clamping head, to attain a state of balance.

What is claimed is:

1. A balancing weight assembly for balancing an elongate rotary body, comprising a clip having a clamping head and recesses on the side of the body for holding balancing weight members, and a set of balancing weight members, one or more of which can in use be fitted on the clip for balancing, the balancing weight members of the set being graduated in weight and the heaviest balancing weight member of the set substantially corresponding to the weight of the clamping head.

2. A balancing weight assembly according to claim 1 wherein each said recess is formed by a tongue portion on the clip.

3. A balancing weight assembly according to claim 2 wherein each balancing weight member has a clip member with barb portions insertable into a respective said recess.

4. A balancing weight assembly for balancing an elongate rotary body, comprising a clip having a clamping head, and a set of balancing weight members, one or more of which can in use be fitted between the rotary body and the clip for balancing, the balancing weight members of the set being graduated in weight with the heaviest balancing weight member of the set substantially corresponding to the weight of the clamping head and each having raised portions thereon for preventing lateral movement relative to the clip.

5. A balancing weight assembly according to claim 4 wherein said means for preventing the lateral movement comprises chamfered portions at respective edges of the balancing weight member.

6. A balancing weight assembly according to claim 1 wherein the clamping head and/or the weight members are accentuated by coloring thereof.

* * * * *